(12) United States Patent
Liang et al.

(10) Patent No.: US 8,593,437 B2
(45) Date of Patent: *Nov. 26, 2013

(54) STYLUS HAVING RETRACTED AND EXTENDED POSITIONS

(75) Inventors: Shi-Xu Liang, Shenzhen (CN); Chuan-I Liu, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 469 days.

This patent is subject to a terminal disclaimer.

(21) Appl. No.: 12/890,735

(22) Filed: Sep. 27, 2010

(65) Prior Publication Data

US 2011/0292003 A1    Dec. 1, 2011

(30) Foreign Application Priority Data

May 27, 2010    (CN) .......................... 2010 2 0205882

(51) Int. Cl.
*G06F 3/033* (2013.01)
*B43K 5/16* (2006.01)
*B43K 1/10* (2006.01)

(52) U.S. Cl.
USPC ............................ 345/179; 401/99; 401/258

(58) Field of Classification Search
USPC ...................................................... 345/179
See application file for complete search history.

(56) References Cited

U.S. PATENT DOCUMENTS

| | | | | |
|---|---|---|---|---|
| 1,772,868 A | * | 8/1930 | Keeran | 401/31 |
| 2,370,414 A | * | 2/1945 | Ostrander | 15/105 |
| 3,985,455 A | * | 10/1976 | Wahlberg | 401/30 |
| 4,221,490 A | * | 9/1980 | Malm | 401/29 |
| 4,667,182 A | * | 5/1987 | Murphy | 340/407.2 |
| 4,675,476 A | * | 6/1987 | Kobayashi | 345/173 |
| 5,475,401 A | * | 12/1995 | Verrier et al. | 345/179 |
| 5,793,360 A | * | 8/1998 | Fleck et al. | 345/179 |
| 5,850,059 A | * | 12/1998 | Yoshimura | 178/19.01 |
| 5,889,512 A | * | 3/1999 | Moller et al. | 345/179 |
| 5,895,160 A | * | 4/1999 | Ginelli | 401/17 |
| 6,118,437 A | * | 9/2000 | Fleck et al. | 345/179 |
| 6,252,182 B1 | * | 6/2001 | Lai | 178/19.04 |
| 6,254,295 B1 | * | 7/2001 | Cheng | 401/30 |
| 6,262,684 B1 | * | 7/2001 | Stewart et al. | 343/702 |
| 6,533,483 B2 | * | 3/2003 | Carroll et al. | 401/194 |
| 6,667,740 B2 | * | 12/2003 | Ely et al. | 345/179 |
| 6,707,451 B1 | * | 3/2004 | Nagaoka | 345/179 |
| 7,518,598 B2 | * | 4/2009 | Liu | 345/179 |
| 2002/0158854 A1 | * | 10/2002 | Ju | 345/179 |
| 2003/0077103 A1 | * | 4/2003 | Kim | 401/68 |
| 2003/0184529 A1 | * | 10/2003 | Chien et al. | 345/179 |

(Continued)

*Primary Examiner* — Bipin Shalwala
*Assistant Examiner* — Michael J Jansen, II
(74) *Attorney, Agent, or Firm* — Altis & Wispro Law Group, Inc.

(57) ABSTRACT

A stylus includes a stylus member including a first housing defining a first receptacle; a stylus body assembly slidably and non-rotatably accommodated in the first receptacle. The stylus body assembly including a first threaded hole, and a pen member including a second housing defining a second receptacle, a pen assembly slidably and non-rotatably accommodated in the second receptacle. The pen assembly defining a second threaded hole therethrough; and a shaft including a first threaded portion engaging with the first threaded hole and a second threaded portion engaging with the second threaded hole so rotation of the shaft relative to the first housing and the second housing causes the stylus body assembly to extend into or retract from the first housing and the second housing respectively.

17 Claims, 8 Drawing Sheets

(56) References Cited

U.S. PATENT DOCUMENTS

| | | | |
|---|---|---|---|
| 2004/0213622 A1* | 10/2004 | Kageyama et al. | 401/31 |
| 2005/0146517 A1* | 7/2005 | Robrecht et al. | 345/179 |
| 2005/0206635 A1* | 9/2005 | Hashimoto | 345/204 |
| 2005/0219233 A1* | 10/2005 | Homer | 345/179 |
| 2005/0266595 A1* | 12/2005 | Lee | 438/30 |
| 2006/0006928 A1* | 1/2006 | Utsuno | 327/541 |
| 2007/0020037 A1* | 1/2007 | Liu | 401/259 |
| 2008/0001886 A1* | 1/2008 | Kim et al. | 345/94 |
| 2008/0001894 A1* | 1/2008 | Oh et al. | 345/98 |
| 2008/0049001 A1* | 2/2008 | Liu | 345/204 |
| 2008/0131189 A1* | 6/2008 | Yoon | 401/116 |
| 2008/0143662 A1* | 6/2008 | Hong | 345/92 |
| 2009/0040204 A1* | 2/2009 | Hashimoto | 345/204 |
| 2009/0040245 A1* | 2/2009 | Hashimoto | 345/690 |
| 2009/0058890 A1* | 3/2009 | Kurihara | 345/690 |
| 2010/0225842 A1* | 9/2010 | Hur et al. | 349/48 |
| 2010/0253638 A1* | 10/2010 | Yousefpor et al. | 345/173 |
| 2010/0321345 A1* | 12/2010 | Pearce et al. | 345/179 |
| 2011/0090212 A1* | 4/2011 | Han et al. | 345/212 |
| 2011/0193826 A1* | 8/2011 | Liang | 345/179 |
| 2011/0261024 A1* | 10/2011 | Liang et al. | 345/179 |

* cited by examiner

STYLUS HAVING RETRACTED AND EXTENDED POSITIONS

CROSS-REFERENCE TO RELATED APPLICATIONS

The present application is related to co-pending U.S. patent application Ser. No. 12/840,415, entitled "STYLUS", by Liang et al. This application has the same assignee as the present application and has been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, and personal organizers. These devices typically include a display module under the touch screen. The display module generates target images associated with menu options, programs, user choices, and other operations. The user controls the device by pressing the touch screen over the target image with a stylus. However, typical styluses have no other functions like a pen for writing on paper.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, stylus-based or keyboard-based hand-held devices, remote control units, portable media players (such as an MP3 or DVD player) that have wireless communication capability and the like. Accordingly, any reference herein to the mobile telephone should also be considered to apply equally to other portable wireless electronic devices.

Figure 1:
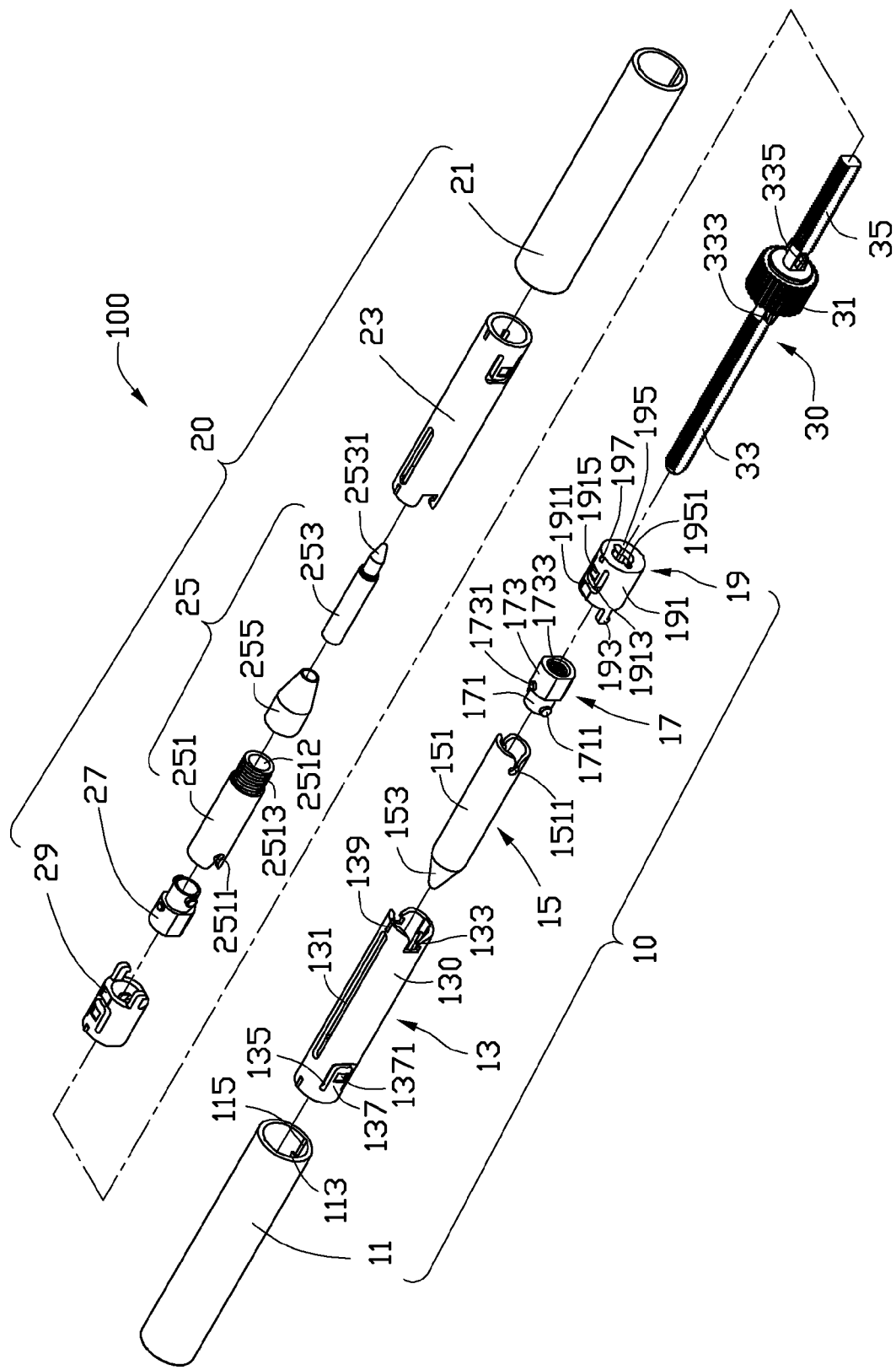
FIG. 1 is an exploded view of an exemplary stylus.

Referring to FIG. 1, a stylus 100 includes a stylus member 10, a pen member 20 and a shaft 30 connecting the stylus member with the pen member. The stylus member 10 includes a first housing 11, a first guiding element 13, a stylus body 15, a first cam 17 and a first retaining element 19. The first guiding element 13 is mounted in the first housing 11; the stylus body 15 is mounted to the first cam 17; the first cam 17 is slidably mounted to the first guiding element 13; the first retaining element 19 is mounted in the first housing 11; the shaft 30 is rotatably mounted to the first retaining element 19 so the shaft 30 can rotate relative to the first housing 11, and the shaft 30 engages with the first cam 17 so the first cam 17 can rotate relative to the shaft 30.

Figure 2:
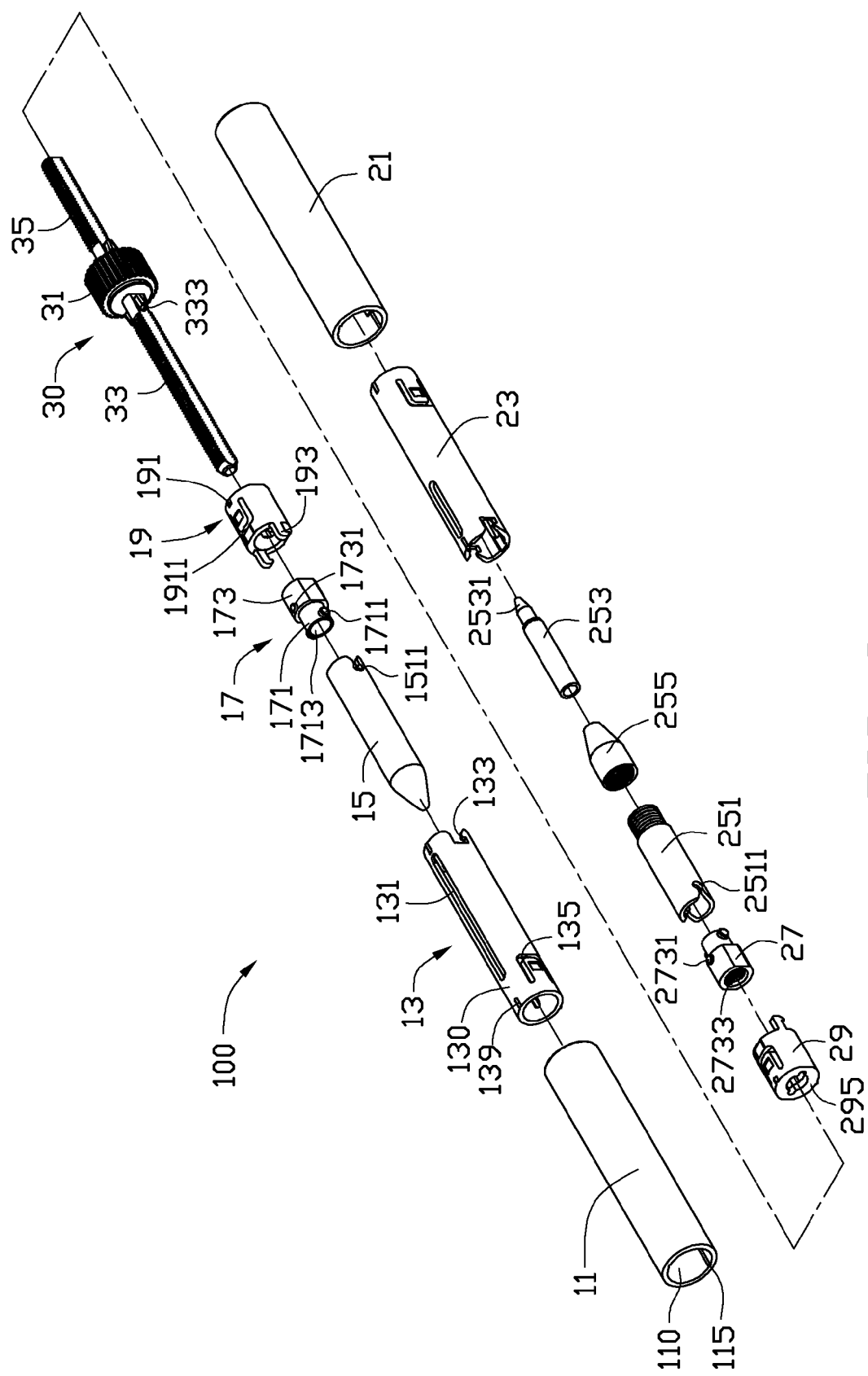
FIG. 2 is another exploded view of the exemplary stylus shown in FIG. 1.
Figure 3:
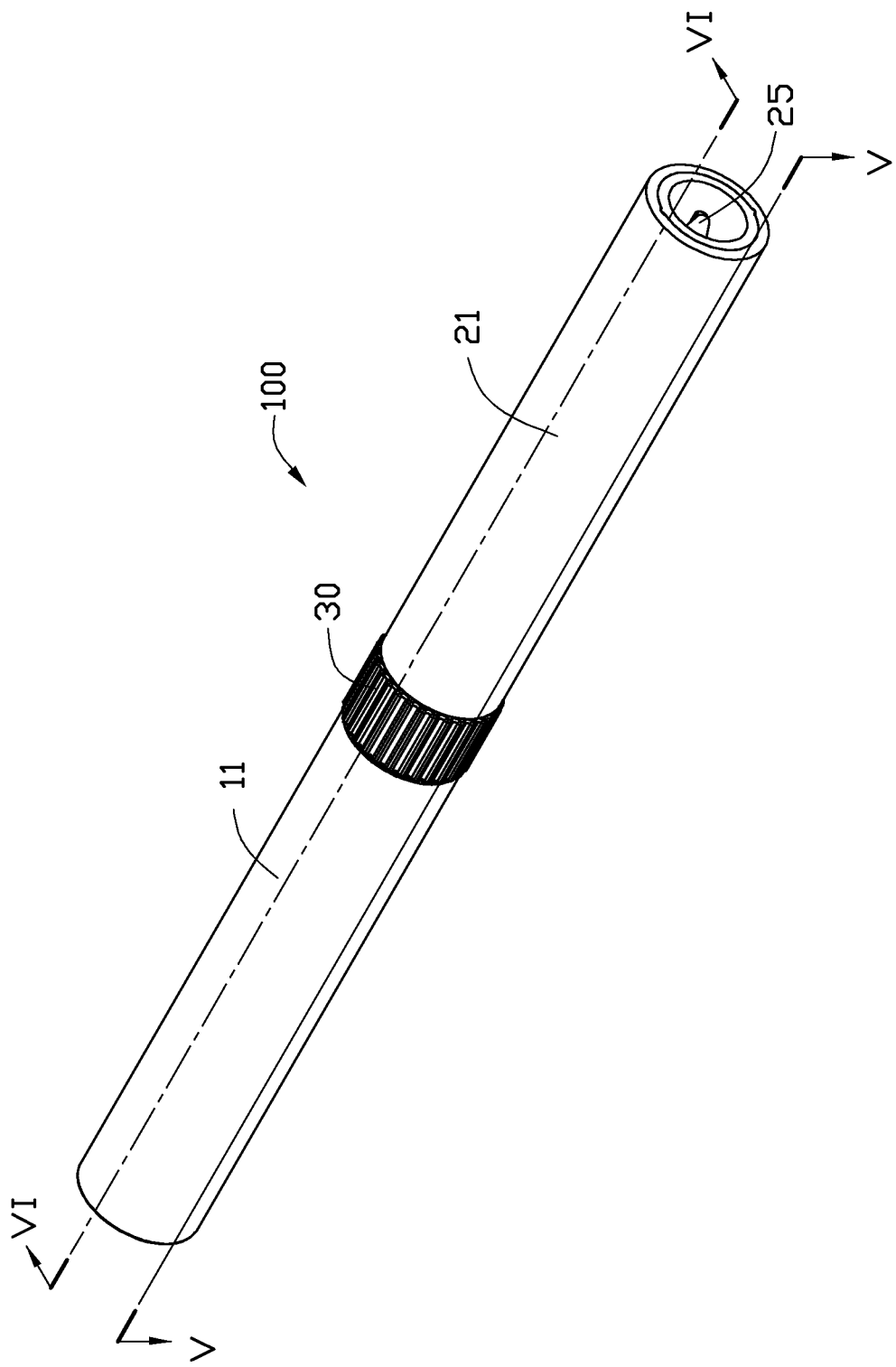
FIG. 3 is an assembled view of the stylus shown in FIG. 1.
Figure 4:
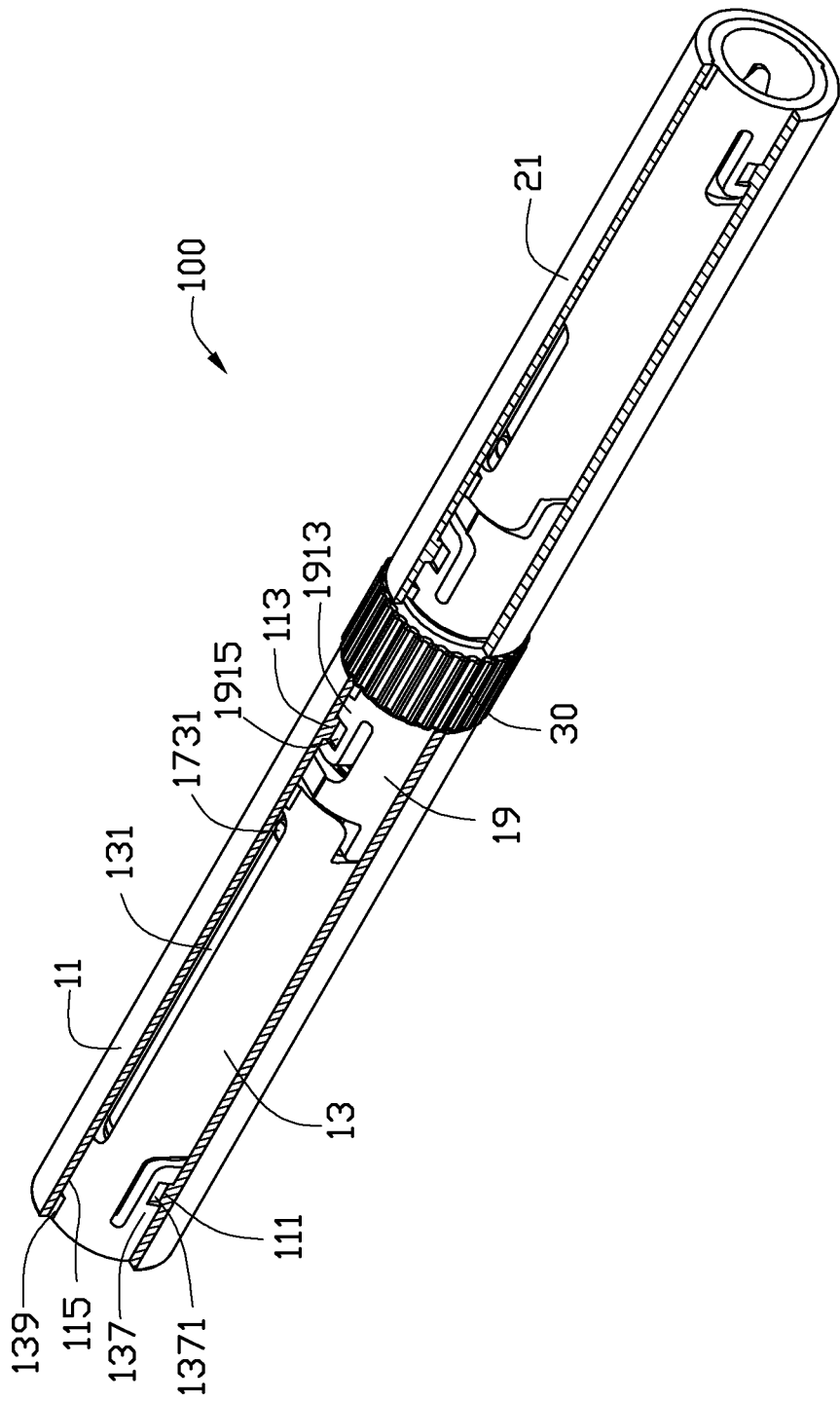
FIG. 4 is a cut-away view of the stylus shown in FIG. 3.

Referring to FIGS. 1-2 and 4, the first housing 11 is hollow, and includes a first receptacle 110 defined longitudinally therethrough and two opposite first latching portions 111 positioned in an inner wall thereof and located at/near one end thereof. The first latching portions 111 latch with the first guiding element 13 to hold the first guiding element 13 in the first housing 11. The first housing 11 further includes two opposite first ribs 113 positioned in the inner wall thereof and located at/near another end thereof. The first ribs 113 latch with the first retaining element 19 to hold the first retaining element 19 in the first housing 11. The first housing 11 may further define two opposite first positioning grooves 115 from one end thereof to another end thereof. The first positioning grooves 115 prevent the rotation of the first guiding element 13 relative to the first housing 11.

The first guiding element 13 is hollow, and includes a peripheral wall 130 that encloses a first chamber 132. The first guiding element 13 has two diametrically opposed first guiding grooves 131 longitudinally defined through the peripheral wall 130. The first guiding grooves 131 are for guiding the first cam 17 to slide relative to the first guiding element 13 so the first cam 17 can slide relative to the first housing 11. The first guiding element 13 further has two first notches 133 defined at one end thereof and two first U-shaped channels 135 defined at another end thereof. The first notches 133 are aligned each other and are for latching the first retaining element 19 to the first guiding element 13. Each first U-shaped channel 135 defined through opposing sides of the peripheral wall 130, define each first tab 137. Each first tab 137 has a first latching slot 1371 defined therein facing away from another first tab 137. Each first latching slot 1371 latches with one of the first latching portions 111 to hold the first guiding element 13 in the first housing 11. The first guiding element 13 may further include a plurality of first positioning strips 139 respectively protruding from an outer surface thereof. The first positioning strips 139 are received in the first positioning grooves 115 of the first housing 11 to prevent the first guiding element 13 from rotating relative to the first housing 11.

Figure 5:
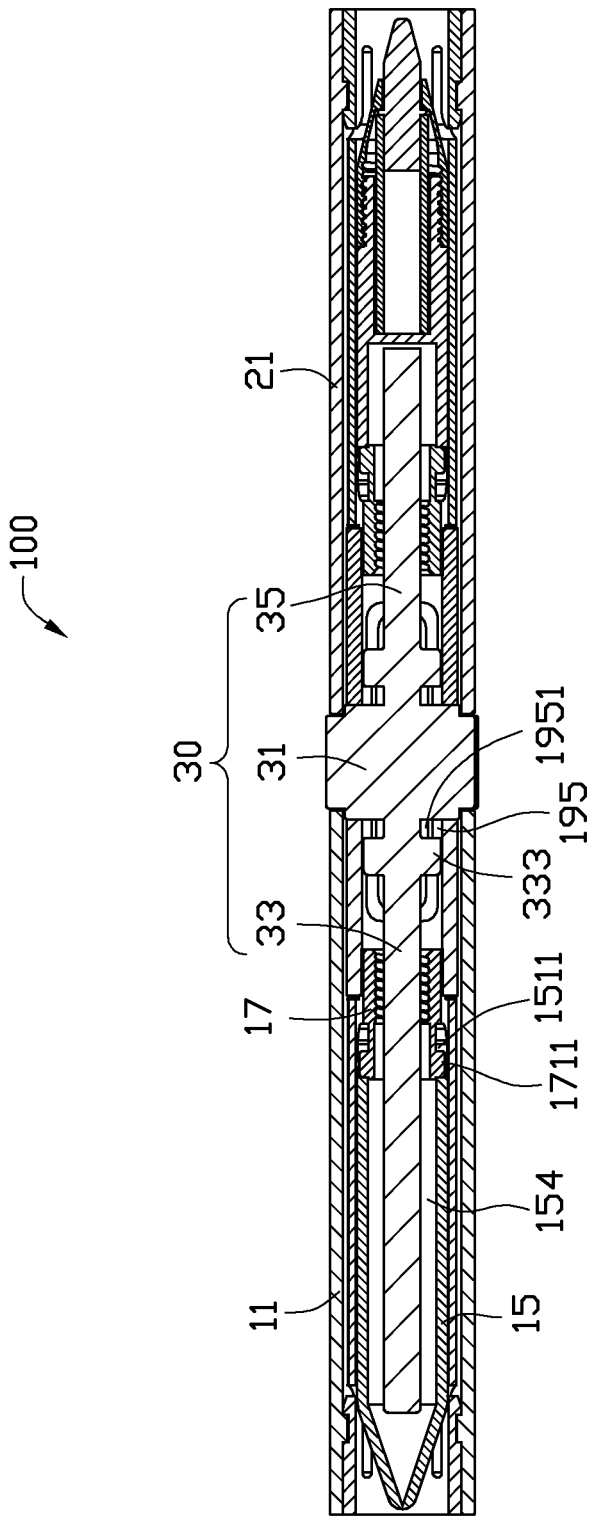
FIG. 5 is a cross-sectional view of the stylus in FIG. 3 along the line V-V, and wherein the stylus is in a closed position.

Referring to FIGS. 1 and 5, the stylus body 15 is received within the first receptacle 110 of the first housing 11 and partially extends out of the first housing 11. The stylus body 15 is used to contact a touch screen display of an electronic device (not shown). The stylus body 15, in this embodiment, may include a body 151 and a head 153 protruding from one end of the body 151. The body 151 has generally the same shape as, but slightly smaller than, the first receptacle 110 of the first housing 11, so the body 151 can be slidably fitted in the first receptacle 110. The stylus body 15 further includes a compartment 154 longitudinally defined in another end of the body 151 opposite to the head 153, for accommodating the shaft 30 such as shown in FIG. 5. The stylus body 15 further includes two aligned latching holes 1511 defined therethough for latching the first cam 17 to the stylus body 15.

The first cam 17 includes a first retaining portion 171 and a first sliding portion 173 connecting with the first retaining portion 171. The first retaining portion 171 has two opposite first latching blocks 1711 protruding therefrom. The first latching blocks 1711 are latched in the latching holes 1511 to hold the first cam 17 to the stylus body 15. The first retaining portion 171 likewise has a first opening 1713 defined therethrough for the shaft 30 to pass through. The first sliding portion 173 has two first sliding blocks 1731 protruding therefrom. The first sliding blocks 1731 are slidably accommodated in the first guiding grooves 131 so the first cam 17 can slide relative to the first guiding element 13. The first sliding portion 173 further has a first threaded hole 1733 defined therethrough, and the first threaded hole 1733 communicates with the first opening 1713.

Referring to FIGS. 1 and 5, the first retaining element 19 includes a first tube 191, two first hooks 193 protruding from one end of the first tube 191, and a first flange 195 positioned at an inner surface of the first tube 191 opposite to the first hooks 193. The first tube 191 defines two opposite first U-shaped troughs 1911, each of which encloses a first securing portion 1913. Each first securing portion 1913 has a first securing slot 1915 defined therein facing away from another first securing portion 1913. Each first securing slot 1915 latches with one of the first ribs 113 to hold the first retaining element 19 to the first housing 11. The first tube 191 further includes two first raised portions 197 protruding therefrom. The first raised portions 197 are accommodated in the first positioning grooves 115 so the first retaining element 19 cannot rotate relative to the first housing 11. Each of the first hooks 193 latches in one of the first notches 133 to latch the first retaining element 19 to the first guiding element 13. The first flange 195 has a threaded first aperture 1951 defined therethrough so the shaft 30 can pass through the first flange 195.

Figure 6:
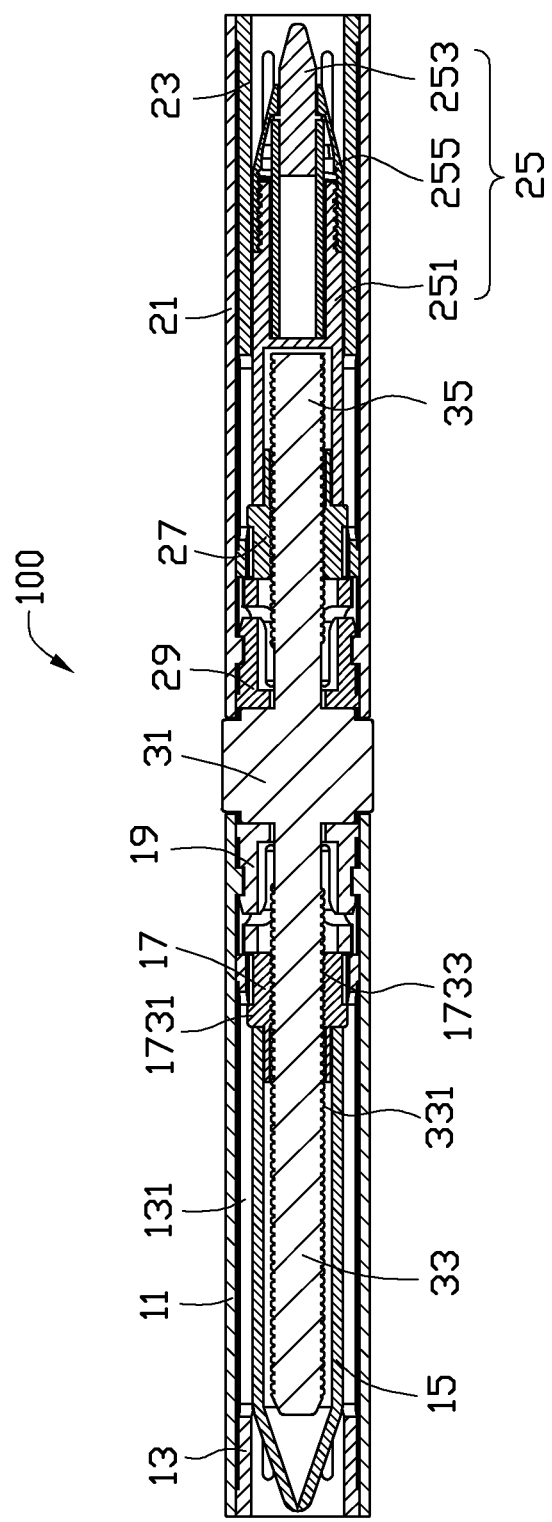
FIG. 6 is a cross-sectional view of the stylus in FIG. 3 along the line VI-VI, and wherein the stylus is in the closed position.
Figure 7:
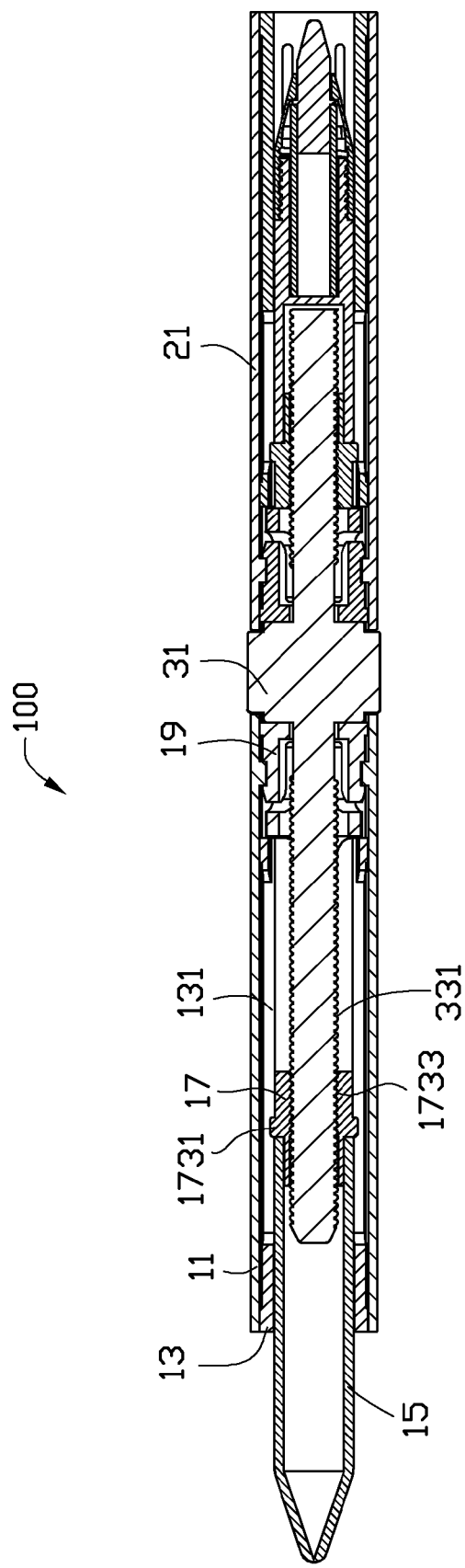
FIG. 7 is similar to FIG. 6, but showing the stylus is in an extended position.
Figure 8:
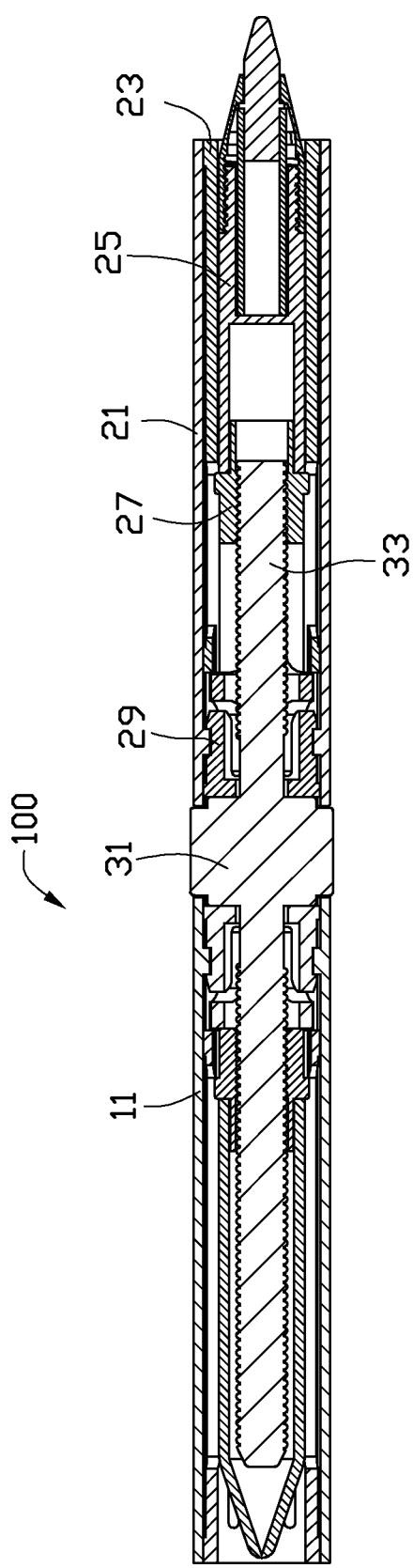
FIG. 8 is similar to FIG. 6, but showing the stylus is in another extended position.

Referring to FIGS. 1-2 and 6, the pen member 20 includes a second housing 21, a second guiding element 23, a pen 25, a second cam 27 and a second retaining element 29. The second guiding element 23 is mounted in the second housing 21, the pen 25 is mounted to the second cam 27, the second cam 27 is slidably mounted to the second guiding element 23, the second retaining element 29 is mounted in the second housing 21, the second retaining element 29 is rotatably mounted to the shaft 30 so the second retaining element 29, the second housing 21 can rotate relative to the shaft 30, and the shaft 30 engages with the second cam 27 so the second cam 27 can rotate relative to the shaft 30. In this exemplary embodiment, the second housing 21, the second guiding element 23, the second cam 27 and the second retaining element 29 have the same structure as the first housing 11, the first guiding element 13, the first cam 17 and the first retaining element 19, respectively. Thus, the detailed structures of the second housing 21, the second guiding element 23, the second cam 27 and the second retaining element 29 are not described in this exemplary embodiment. The pen 25 may include a shell 251 defining a receiving hole 2512 therein, two opposite securing hole 2511 defined at one end of the shell 251, a threaded portion 2513 formed at another end of the shell 251, a pen body 253 including a pen head 2531 protruding from one end of the pen body 253, and a cover 255. The pen body 253 is accommodated in the receiving hole 2512 and the pen head 2531 extends out of the receiving hole 2512. The cover 36 is screwed on the threaded portion 2513 to hold the pen body 253 in the receiving hole 2512.

Referring to FIGS. 1, 5, and 6, the shaft 30 includes an operating portion 31, a first threaded portion 33 positioned at one end of the operating portion 31 and a second threaded portion 35 positioned at another end of the operating portion 31. The first threaded portion 33 engages with the first threaded hole 1733. The second threaded portion 35 engages with the second cam 27. The shaft 30 further includes two first protrusions 333 protruding from the shaft 30 and positioned between the first threaded portion 33 and the operating portion 31, and two second protrusions 335 protruding from the shaft 30 and positioned between the second threaded portion 35 and the operating portion 31. The first protrusions 333 and the second protrusions 335 are spaced from the operating portion 31. When the shaft 30 is accommodated in the first retaining element 19, the first flange 195 is held between the operating portion 31 and the first protrusions 333, thereby preventing the shaft 30 and the first retaining element 19 from separating. When the shaft 30 is accommodated in the second retaining element 29, a second flange 295 (FIG. 2) is held between the operating portion 31 and second first protrusions 333, thereby preventing the shaft 30 and the second retaining element 29 from separating.

Referring to FIGS. 1, and 3-6, in assembly, the first guiding element 13 is inserted into the first housing 11, each positioning strip 139 is positioned in one of the first positioning grooves 115, and each latching portion 111 is latched in one of the latching slots 1371 so the first guiding element 13 is mounted in the first housing 11. Each latching block 1711 is latched in one of the latching holes 1511 so the first cam 17 is mounted to the stylus body 15. The first cam 17/stylus body 15 assembly is inserted in the first guiding element 13, each first sliding block 1731 is accommodated in one of the first guiding grooves 131. Each hook 193 latches with one of the first notches 133 and each rib 113 latches in one of the first securing slots 1915 so the first retaining element 19 is firmly mounted in the first housing 11. Each raised portion 197 is accommodated in one of the first positioning grooves 115 so the first retaining element 19 cannot rotate relative to the first housing 11. Thus, an assembled stylus member 10 is yielded. The first threaded portion 33 is inserted in the first retaining element 19 until the first threaded portion 33 resists the first cam 17. Then, rotating the operating portion 31 to engage the first threaded portion 33 to the first sliding portion 173 until the first protrusions 333 pass through the first aperture 1951. At this time, the first flange 195 is held between the operating portion 31 and the first protrusions 333, thereby preventing the shaft 30 and the first retaining element 19 from separating. It is to be noted that the first protrusions 333, in this embodiment, are larger than the first aperture 1951 so the first protrusions 333 cannot freely pass through the first aperture 1951, thereby preventing the shaft 30 and the first retaining element 19 from separating. Finally, the second housing 21, the second guiding element 23, the pen 25, the second cam 27 and the second retaining element 29 can be assembled to an assembled pen member 20 in such a way similar to the stylus member 10, and the assembled pen member 20 can be assembled to the shaft 30 in such a way similar to the stylus member 10 to the shaft 30.

Referring to FIGS. 4-8, the use of the stylus 100 will be described relative to the stylus member 10. However, such action equally applies to the pen member 20. The shaft 30 is rotated relative to the first housing 11, by rotation of the operating portion 31. As the first threaded hole 1733 of the first cam 17 engages with the first threaded portion 33 of the shaft 30, when the shaft 30 is rotated, the first cam 17 should rotate relative to the shaft 30, but the first sliding blocks 1731 are accommodated in the first guiding grooves 131 to limit the rotation of the first cam 17 relative to the shaft 30. Thereby, as the shaft 30 rotates, the first cam 17 will slide relative to the first guiding element 13 along the first guiding grooves 131, and the stylus body 15 extends into or retracts from the first housing 11 together with the first cam 17 relative to the first guiding element 13.

It is understood that the stylus body 15 and the first cam 17 can be integrated into one stylus body assembly in which the first cam 17 may be omitted and the first sliding blocks 1731 and the first threaded hole 1733 are disposed at the stylus body 15.

It is understood that the pen 25 and the second cam 27 can be integrated into one pen assembly in which the second cam 27 may be omitted and a second sliding blocks 2731 and a second threaded hole 2733 are disposed at the pen 25.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
  a stylus member comprising:
  a first housing defining a first receptacle therethrough;
  a stylus body assembly slidably and non-rotatably accommodated in the first receptacle of the first housing, the stylus body assembly including a first threaded hole defined therethrough;
  a first retaining element mounted in the first housing and including a first tube and a first flange positioned at an inner surface of the first tube; and
  a pen member comprising:
  a second housing defining a second receptacle therethrough;
  a pen assembly slidably and non-rotatably accommodated in the second receptacle of the second housing, the pen assembly defining a second threaded hole therethrough; and
  a shaft rotatably passing through the first housing and the second housing, the shaft including a first threaded portion engaging with the first threaded hole such that rotation of the shaft relative to the first housing causes the stylus body assembly to slide relative to the first housing to extend out of or retract into the first housing, depending upon the direction of rotation of the shaft, and the shaft further including a second threaded portion engaging with the second threaded hole and rotation of the shaft relative to the second housing causes the pen assembly to slide relative to the second housing to extend out of or retract into the second housing, depending upon the direction of rotation of the shaft;
  the shaft further including an operating portion positioned between the first threaded portion and the second threaded portion, and a first protrusion protruding between the first threaded portion and the operating portion;
  wherein the first flange is held between the operating portion and the first protrusions, thereby preventing the shaft and the first housing from separating.

2. The stylus as claimed in claim 1, wherein the first housing further includes a guiding groove defined therethrough; the stylus body assembly further includes a sliding block slidably accommodated in the guiding groove to make the stylus body assembly non-rotatably received in the housing.

3. The stylus as claimed in claim 1, wherein the shaft further includes a second protrusion protruding between the second threaded portion and the operating portion.

4. The stylus as claimed in claim 1, wherein the stylus further includes a second retaining element mounted in the second housing; the second retaining element includes a second tube, a second flange is positioned at an inner surface of the second tube, the second flange is held between the operating portion and the second protrusions, thereby preventing the shaft and the second housing from separating.

5. The stylus as claimed in claim 1, wherein the first tube further includes two first raised portions protruding therefrom, the first housing further defines two opposite first positioning grooves from one end thereof to another end thereof; the first raised portions are respectively accommodated in the first positioning grooves so the first retaining element cannot rotate relative to the first housing.

6. The stylus as claimed in claim 1, wherein the first tube has two opposite securing slots defined therein; the first housing further includes two opposite first ribs positioned in the first receptacle; each first rib latching with one of the securing slots to hold the first retaining element in the first housing.

7. The stylus as claimed in claim 6, wherein the first tube defines two opposite first U-shaped troughs, each of first U-shaped troughs encloses a first securing portion, each first securing slot is defined in one of the first securing portions.

8. The stylus as claimed in claim 1, wherein the stylus further includes a first guiding element mounted in the first housing, the first guiding element has a first guiding groove longitudinally defined therein, the stylus body assembly includes a sliding block slidably engage with the first guiding groove.

9. The stylus as claimed in claim 8, wherein the first guiding element has two opposite first latching slots defined therein; the first housing has two opposite first latching portions positioned in an inner wall thereof; each first latching slot latches with one of the first latching portions to hold the first guiding element in the first housing.

10. The stylus as claimed in claim 8, wherein the stylus assembly further includes a first cam mounted on the stylus body, the first threaded hole is defined in the first cam.

11. The stylus as claimed in claim 10, wherein the first cam includes a first retaining portion; the first retaining portion has two opposite first latching blocks protruding therefrom; the stylus body further includes two aligned latching holes defined therethough; the first latching blocks are latched in the latching holes to hold the first cam to the stylus body.

12. The stylus as claimed in claim 11, wherein the first cam further includes a first sliding portion connecting with the first retaining portion, the sliding block protrudes from the first sliding portion.

13. The stylus as claimed in claim 12, wherein the first threaded hole is defined through the first sliding portion.

14. The stylus as claimed in claim 13, wherein the first retaining portion further has a first opening defined therethough for the shaft to pass through, the first opening communicates with the first threaded hole.

15. The stylus as claimed in claim 1, wherein the stylus body further includes a compartment longitudinally defined one end thereof; the compartment is for accommodating the shaft.

16. A stylus, comprising:

a first housing defining a first receptacle and a first guiding groove therethrough;

a stylus body retractably accommodated in the first receptacle of the first housing;

a first cam securely mounted to the stylus body, the first cam defining a first threaded hole therethrough and slidably and non-rotatably received in the first housing and two opposite first sliding blocks protruding therefrom;

a first retaining element mounted in the first housing and including a first tube and a first flange positioned at an inner surface of the first tube;

a second housing defining a second receptacle and a second guiding groove therethrough;

a pen retractably accommodated in the second receptacle of the second housing;

a second cam securely mounted to the pen, the second cam defining a second threaded hole therethrough and slidably and non-rotatably received in the second housing and two opposite second sliding blocks protruding therefrom; and a shaft rotatably and non-slidably mounted to the first housing and the second housing, the shaft including a first threaded portion engaging with the first threaded hole and a second threaded portion engaging with the second threaded hole;

the shaft further including an operating portion positioned between the first threaded portion and the second threaded portion, and a first protrusion protruding between the first threaded portion and the operating portion;

wherein when the shaft rotates relative to the first housing, the first sliding blocks slides in the first guiding grooves so the first cam slides relative to the first housing;

when the shaft rotates relative to the second housing, the second sliding blocks slides in the second guiding grooves so the second cam slides relative to the second housing;

the first flange is held between the operating portion and the first protrusions, thereby preventing the shaft and the first housing from separating.

17. The stylus as claimed in claim 16, wherein the first housing further includes a guiding groove defined therethrough; the stylus body assembly further includes a sliding block slidably accommodated in the guiding groove; when the stylus body assembly slide relative to the first housing, the sliding block slides in the guiding groove.

* * * * *